United States Patent [19]

Malyon

[11] Patent Number: 4,645,332
[45] Date of Patent: Feb. 24, 1987

[54] PHOTOCOPYING DEVICE
[75] Inventor: Brian R. Malyon, Feltham, England
[73] Assignee: The British Library Board, London, England
[21] Appl. No.: 767,155
[22] Filed: Aug. 15, 1985
[30] Foreign Application Priority Data
Sep. 12, 1984 [GB] United Kingdom ............... 8422997
[51] Int. Cl.⁴ ..................... G03B 27/32; G03B 27/52
[52] U.S. Cl. ................................................... 355/25
[58] Field of Search ..................... 355/25, 75, 3 R, 8, 355/11

[56] References Cited
U.S. PATENT DOCUMENTS 4,247,192  1/1981  Komori et al. ................. 355/25 X
4,415,255 11/1983  Huber et al. .................... 355/75 X
4,567,528  1/1986  Wilman et al. ................. 355/25 X Primary Examiner—Richard A. Wintercorn
Attorney, Agent, or Firm—Gifford, Groh, VanOphem, Sheridan, Sprinkle and Dolgorukov

[57] ABSTRACT

A photocopying device which is to be attached to a conventional photocopying machine, gives to the machine the capability of copying from bound books. The device has a V-shaped book rest for supporting a book in an open condition and a scanning head with a light source. The device can be mounted on a photocopying machine so that light from the scanning head is reflected from a page of the book back to the drum of the photocopying machine, along the same route as is taken by light travelling to the drum during conventional operation, without the device.

4 Claims, 2 Drawing Figures

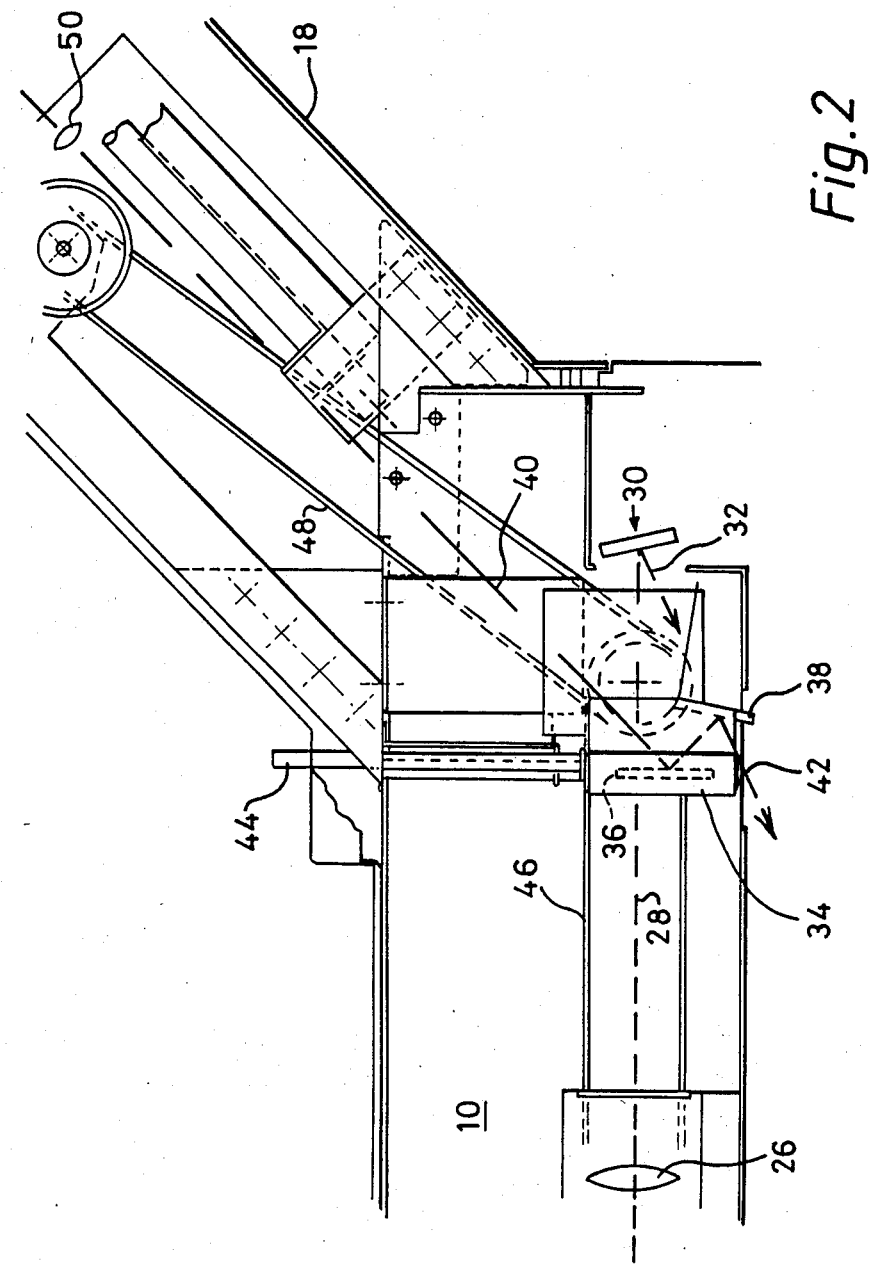

PHOTOCOPYING DEVICE

DESCRIPTION

1. Field of the Invention

This invention relates to a photocopying device for attachment to a conventional photocopying machine to permit copies to be made from a bound book.

2. Background to the Invention

Making photocopies from bound books on a conventional photocopier with a flat platen is never very satisfactory. It is not good for the book because the binding is damaged if the book is opened out flat, and it is often difficult to ensure that the desired part of the book is correctly positioned relative to the platen so the correct part is actually copied.

It is however rare for a photocopying machine to be installed in a position where it will be used exclusively for photocopying from books, and it is desirable that the flexibility of being able to use the machine in the normal manner be retained. A dedicated machine which will only copy from bound books is therefore not normally practical.

SUMMARY OF THE INVENTION

According to the present invention there is provided a photocopying device for attachment to a photocopying machine to permit copies to be made from a bound book, the device comprising a V-shaped book support for supporting a book in an open condition, a scanning head with a light source for scanning a page of a book in the support, means for mounting the head on a photocopying machine, and means for focusing and directing light from the scanning head onto the drum of the photocopying machine, with the focused light reaching the drum from the same direction as is taken by light in operation of the machine without the device.

Since light reaches the drum from the same direction both when the photocopying machine is being used in its normal mode and when the machine is being used with the device according to the invention, no substantial modification is needed to the machine.

Preferably a drive is taken from the light source drive for the machine to the light source drive for the device, so that the light source in the device traverses a page of the book at the same speed as used by the light source of the machine in normal operation.

The device preferably includes a mirror arrangement which can be interposed in the light path within the machine to direct the light from the device light source to the drum, and this mirror arrangement is preferably movable so that, while the device remains mounted on the machine, the mirrors can either be interposed in the light path to allow photocopies to be taken by the device, or can be removed from the light path to allow photocopies to be taken by the device, or can be removed from the light path to allow the machine to operate in its normal mode, whilst the device remains attached.

The drive transmission to the scanning head of the device may be by means of toothed belts from the drive of the machine.

BRIEF DESCRIPTION OF THE DRAWINGS

The invention will now be further described, by way of example, with reference to the accompanying drawings, in which:

FIG. 2 is a detail of some of the internal parts of the machine in the area enclosed by dotted lines in FIG. 1.

DESCRIPTION OF A PREFERRED EMBODIMENT

Figure 1:
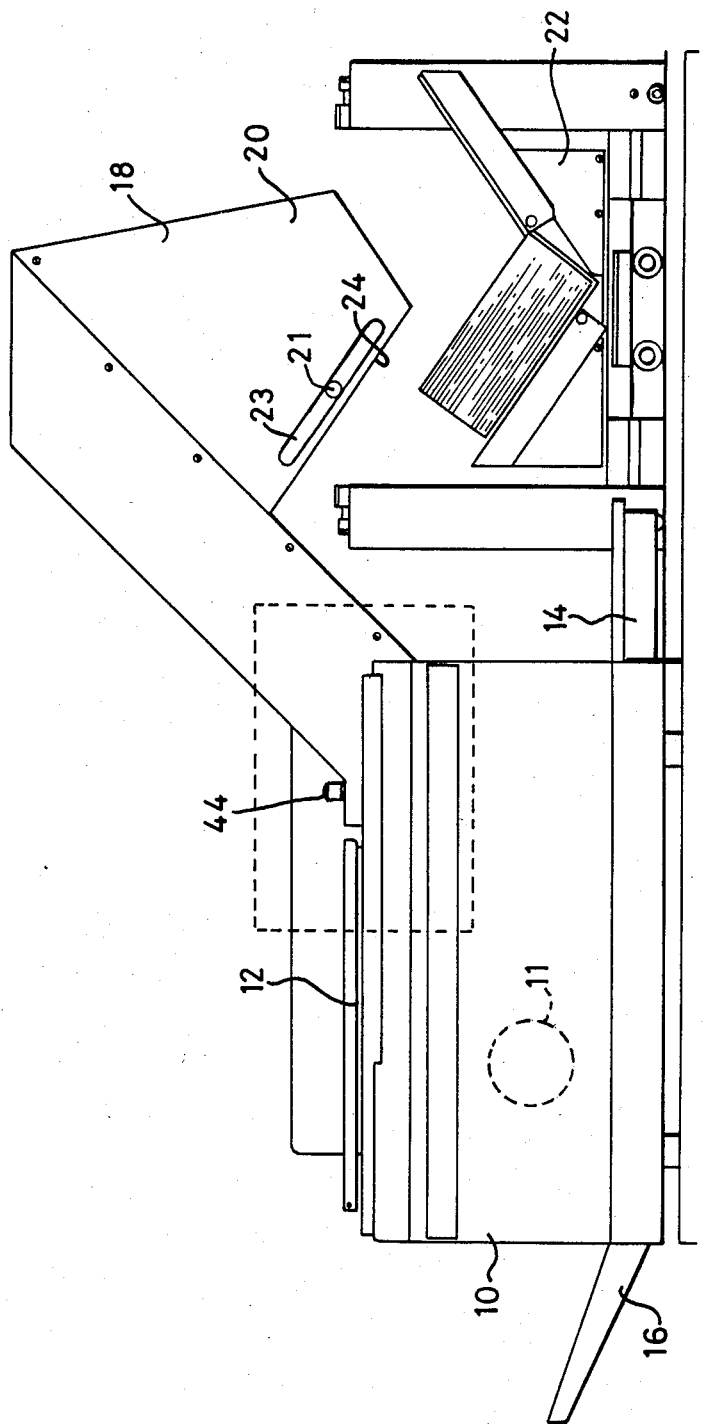
FIG. 1 is a side view of a photocopying device in accordance with the invention mounted on a photocopying machine.

FIG. 1 shows a conventional photocopying machine 10 with a platen 12 on its upper face, a paper tray 14 and an output tray 16. In normal use of the machine, documents to be copied are placed on the platen 12 where they are scanned by a moving light source within the machine.

A photocopying device 18 is mounted on the machine 10. The device has a scanning head 20 which is located above a book support 22 which supports a book in open position. The scanning head 20 has a window in its face 24, and a travelling light source is located behind this window. In use, the book on the support 22 is raised so that the page to be copied comes into contact with the window in the face 24.

Some of the internal mechanism of the machine with the device mounted on it is shown in FIG. 2. In normal operation of the photocopier 10, without the device 18, the light to the drum (the drum is not shown) passes through a lens arrangement indicated schematically at 26 along a path 28 to a mirror 30. The light is reflected from the mirror 30 and passes along a reflected light path 32 towards the drum To enable the device 18 to operate, a mirror unit 34 is interposed in the light path 28. The unit 34 has a first mirror 36 and a second mirror 38. The light path coming from the device 18 is indicated at 40 and it will be seen that the light is reflected first from the mirror 36 then from the mirror 38 to a reflected light path 42. The mirrors 36 and 38 are positioned and angled such that the reflected light path 42 is colinear with the reflected light path 32, so that irrespective of which mode the machine 10 is operating in, light will reach the drum from the same direction.

The mirror unit 34 can be lifted out of the light path 28 by lifting and turning a knob 44 which is accessible from the outside. When the mirror unit has been moved out of the way, the normal light path 28, 32 is restored.

There is thus no need to demount the device 18 to restore the copier 12 to its normal, single document, copying mode.

To enable the scanning light source in the device 18 to operate at the same speed as the scanning light source in the photocopying machine 10, the drive is transferred from one to the other by means of toothed belts 46 and 48. Additional drive transfer mechanisms may be incorporated, but these are not shown in the drawing.

In order to focus the light passing along the light path 40, a lens indicated schemmatically at 50 is included in the light path, and this lens will be equivalent to the lens 26 in the light path 28.

To facilitate an understanding of the manner of operation of the overall apparatus, a drum is shown diagrammatically at 11 in FIG. 1. Additionally a travelling light source 21 is also shown diagrammatically in FIG. 1 in the unit 18 guided in guides such as 23.

When the device is in operation, and the photocopier is copying from a book, the normal light source in the machine 10 may be temporarily disabled.

It will thus be seen that the device described can be easily attached to a conventional photocopier to enable the photocopier to produce copies from a bound book without damaging the book, and without having to turn the book upside down and spread it flat out on a flat platen. At the same time however, the ability of the copier to work in its normal mode is not impaired and it is only necessary to turn a single control to switch from one copying mode to another.

I claim:

1. A photocopying device for attachment to a photocopying machine having a drum and a light path to permit copies to be made from a bound book, said device comprising:

a V-shaped book support for supporting a book in an open condition;

a scanning head with a light source for scanning a page of a book in the support;

means for mounting the scanning head on the photocopying machine;

means for focusing and directing light from the scanning head onto the drum of the photocopying machine, so that the focused light can reach the drum from the same direction as is taken by light in operation of the machine without the device;

a mirror arrangement which is movable between a first position in which it is interposed in the light path within the machine to direct the light from the light source to the drum, and a second position in which said mirror arrangement is removed from the light path to allow the machine to operate in its normal mode, without removing the device from said machine; and manually operable means connected to said mirror arrangement for manually moving said mirror arrangement between said first and second positions.

2. A device as claimed in claim 1, wherein a drive is provided for the light source of the device and connecting means is provided for connecting the light source drive of the device to the light source drive for the machine, the connecting means being constructed in such a way that the light source in the device traverses a page of the book at the same speed as used by the light source of the machine in normal operation.

3. A device as claimed in claim 2, wherein the drive transmission to the light source of the device is by means of toothed belts from the drive of the machine.

4. A device as claimed in claim 1 wherein said manually operable means comprises a knob which can be lifted and turned to raise the mirror arrangement from said first position and to secure it in said second position.

* * * * *